United States Patent [19]
Schumm, Jr.

[11] Patent Number: 5,837,394
[45] Date of Patent: Nov. 17, 1998

[54] ELECTRIC APPLIANCE AND FLUID DEPOLARIZED CELL WITH LOW PARASITIC USAGE MICROACTUATED VALVE

[75] Inventor: Brooke Schumm, Jr., 31220 Lake Rd., Bay Village, Ohio 44140

[73] Assignees: Brooke Schumm, Jr.; Elizabeth Schumm; Brooke Schumm, III; Kari J. Schumm, all of Bay Village, Ohio

[21] Appl. No.: 681,764

[22] Filed: Jul. 29, 1996

Related U.S. Application Data

[63] Continuation-in-part of Ser. No. 440,079, May 12, 1995, Pat. No. 5,541,016, which is a continuation-in-part of Ser. No. 183,651, Jan. 19, 1994, Pat. No. 5,449,569, which is a continuation-in-part of Ser. No. 886,513, May 20, 1992, Pat. No. 5,304,431.

[51] Int. Cl.$^6$ .............................. H01M 2/12; H01M 12/06
[52] U.S. Cl. .................................. 429/27; 429/34; 429/39
[58] Field of Search .................................. 424/27, 33, 34, 424/39; 55/386

[56] References Cited

U.S. PATENT DOCUMENTS 4,969,938  11/1990  America ........................................ 55/386
5,541,016   7/1996  Schumm, Jr. ................................. 429/27

*Primary Examiner*—Stephen Kalafut
*Attorney, Agent, or Firm*—Daneker, McIntire, Davis, Schumm, Prince & Goldstein, P.C.; Brooke Schumm, III

[57] ABSTRACT

The invention momentarily operates one or more tiny electronic semiconductor microactuator valve systems which operate a slide or flexing gate or gates disposed over the gas entrance hole or holes either on an appliance powered by a gas depolarized battery which has a sealed case or portion of a case, or disposed over an aperture in a gas depolarized battery. By such disposition, the entrance of oxygen from air (or other reacting fluid, either gaseous or liquid), to the gas (for example, air) depolarized electrochemical battery is only permitted when the battery is supplying electrical power to a load or when desired. By using two semiconductor microactuators, or a single microactuator with a ratcheting mechanism, the valve system only need be operated momentarily, usually when the appliance is turned on to open the valve system, and when it is turned off to close the valve system. Power for the valve is preferably derived from the battery itself but could be provided by a separate source. These tiny valves can operate or act as a safety pressure vent and as a safety fuse as well. When electrical power is not required from the battery, the valve system excludes entry of harmful impurities and unneeded fluid reactants thereby increasing the life of the battery during storage and intermittent use. The combination is also useful when the battery is designed to be recharged. Other electronic control or flow control means can be incorporated in the chip to create a truly intelligent control device.

60 Claims, 12 Drawing Sheets

ELECTRIC APPLIANCE AND FLUID DEPOLARIZED CELL WITH LOW PARASITIC USAGE MICROACTUATED VALVE

This application is a continuation-in-part of Ser. No. 08/440,079 filed May 12, 1995, issued as U.S. Pat. No. 5,541,016 on Jul. 30, 1996, which is a continuation-in-part of application Ser. No. 08/183,651 issued as U.S. Pat. No. 5,449,569, Sep. 12, 1995, which application was a continuation-in-part of Ser. No. 07/886,513 filed May 20, 1992 issued as U.S. Pat. No. 5,304,431, Apr. 19, 1994, all of which were invented by this inventor, Brooke Schumm, Jr.

FIELD OF THE INVENTION

This invention relates to an electrical appliance and fluid depolarized battery with a valve system, operating momentarily, utilizing an efficient semiconductor microactuator or valve-on-a-chip system placed on the case of an electrical appliance or a sealed battery (including at least one cell) so that the especially adapted valve system operates to allow depolarizing fluid into the battery when desired and only when desired. Generally this admission of fluid is when the appliance is operating. Power for the valve is preferably derived from the battery itself but could be provided by a separate source within or without the battery or appliance. By using electronic control and/or electromechanical control, this invention reduces the amount of parasitic power consumed by the valve system because the valve system opens the valve and then can rest from operating the valve. This is achieved by mounting the valve system on a computer case or over a battery compartment disposed on the case, among other variations, or on the battery. If mounted on an electric appliance or computer case or battery compartment, repeated purchases of the valve system are avoided. At the same time the advantages are achieved of avoiding the depolarization and weakening of the battery while the electric appliance is not in use. The valve system also can preclude impurities to prevent the battery from unnecessarily discharging and losing power capacity. The system can be designed as a safety valve or fuse, and designed to work with a recharging system.

BACKGROUND OF THE INVENTION

Gas depolarized cells exist in many types and varieties. The most common in commercial use today are metal-air cells, especially zinc-air cells. In a zinc-air cell, the oxygen in air, by a series of reactions, reacts with the zinc in the cell, producing electrical current. Most of the variety of gas depolarized cells to which this invention relates are described in McArthur et al., U.S. Pat. No. 4,547,438, Oct. 15, 1985, Zupancic, U.S. Pat. No. 4,529,673, Jul. 16, 1985, Mathews et al, U.S. Pat. No. 4,177,327, and literature cited in those patents.

The principal advantage of zinc-air cells is that higher energy density—meaning watt-hours per unit of mass—can be achieved using oxygen of the air, or other gas, as a "fluid" cathode material. This is, instead of, for instance, the solid material found in a typical home flashlight battery. A zinc-air cell of a given standard size can contain much more anode and electrolyte volume because the oxygen reactant is "stored" outside in the atmosphere. This is useful in small devices such as hearing aids, and also useful in larger cells, such as flashlight "D" or "C" cells, or in the largest of batteries such as in an electric car where much power is needed, but space used takes away from space for other uses. Similarly, a portable computer or phone is a good use.

Further describing the general design and technical aspects of the cell, in a typical cell (or combination of cells, referred to as a battery) of this type, the negative electrode of the cell, or anode, is made of a metal, most often zinc. The positive electrode, or cathode, is usually manufactured as a plastic-bonded, metal-oxide-and-carbon-porous body adhered to a conductive screen or layer. The metal oxide acts as a catalyst for oxygen reduction and to give the cell start-up power as gas containing oxygen, usually air, diffuses into the cathode pores when the cell is activated. The electrolyte is the material in the cell through which charged ions may pass and where key steps of the chemical reaction producing electrical potential or voltage occur. Schumm, Jr., "Batteries," Encyclopedia of Physical Science and Technology, vol. 2, p. 387, 390, 396–97 (Academic Press, Inc. 1987). The use of the word "air" is employed for convenience to mean an oxygen source.

When such a cell is not operating, the reactant fluid, oxygen in the air, as well as other impurities, should be excluded. Previously to the Schumm inventions mentioned above, no combination of a valve and battery existed where the parasitic use of power by the valve did not substantially diminish the life or the power of the cell or consume too much space or structure.

Excluding fluids and depolarizing gas prevents the cell from degrading through several processes of corrosion, moisture change and impurity entry which: a) shorten the "shelf" or storage life of the cell when it is not in use, and b) necessitate more frequent changes of the cell in an electrically powered device. Since a common use for this type of cell is for a hearing aid, it: is commercially useful not to have to change the battery so frequently. For portable laptop computers, zinc air cells offer a high energy density in an application where battery life is at a premium. Another common use for the cell is in a buoy at sea; exclusion of the humid, salty sea air when the cell is not operating and reduction of the frequency in changing the cell, or cells in a battery, save much labor and money. The control of the passage of water vapor by the valve prevents the cell from swelling or otherwise being damaged, and prevents dehydration of the cell while not operating. Also, carbon dioxide, which degrades the performance of the cell, is precluded from entering the cell when the cell is not operating.

Previous engineering designs used a variety of means to attempt to overcome these problems. Several inventions used a mechanism physically operated by the user where the valve or vent cover is attached to the switch turning a device "on" so that when the switch moves, the cover moves. Derksen, U.S. Pat. No. 2,468,430 dated Apr. 26, 1949; Cheiky, U.S. Pat. No. 4,914,983 dated Apr. 3, 1990, and H. R. Espig and D. F. Porter, Power Sources 4: Research and Development in Non-Mechanical Electrical Power Sources, Proceedings of the 8th International Symposium held at Brighton, September 1972 (Oriel Press ) at p. 342. The physical presence of the operator is required, as well as a device designed with a switch compatible with the battery system.

Another obvious and long-known approach is a solenoid or electromagnetic means to move a valve or cover as the device is turned on or off, which, consumes a substantial amount of the power of the cell or takes up substantial space.

The previously referenced patents, including U.S. Pat Nos. 5,304,431, 5,449,569, and 5,541,016, invented by this same inventor, Dr. Schumm, provide important art in this field.

Previously, limited efforts had been made to have certain types of valves on liquid electrolyte electrochemical cells as well. The prior art of Cheron, U.S. Pat. No. 4,039,728, is related to a valve which consumed substantial power which was the means, in combination with a fuel cell—a special type of fluid depolarized electrochemical cell—to control the circulation of liquid electrolyte in the cell, which valve was actuated based on a parameter which is function of the circulation of electrolyte in the cell.

This invention overcomes the power and space deficiencies of prior art of other inventors by using an automatic valve made of different materials and of much smaller size through micromachining techniques, preferably a small electronic semiconductor microactuator, a "valve-on-a-chip", after the art of J. H. Jerman, U.S. Pat. No. 5,069,419, Dec. 3, 1991, J. H. Jerman, U.S. Pat. No. 5,271,597, Dec. 21, 1993, or W. America, U.S. Pat. No. 4,969,938, Nov. 13, 1990, and a "Fluister: semiconductor microactuator described in Instruments and Apparatus News [IAN], October 1993, p. 47 and Electronic Design, Nov. 1, 1993 p. 3 (those valves and like valves, including those referenced in that patent, referred to as a "semiconductor actuator valve" or "valve on a chip" or more generally an "electrically activated, thermally responsive microactuator"), in conjunction with a gas depolarized electrochemical battery or cell, especially a zinc-air design. The sole means of entry of depolarizing fluid can be through the valve on a chip if used directly on a battery. This patent more often contemplates use on a electrical appliance powered by such a battery.

In U.S. patents by Dr. Schumm bearing appl. Ser. No. 08/440,079 to be issued Jul. 30, 1996, and application Ser. No. 08/183,651 issued as U.S. Pat. No. 5,449,569, a microactuator valve system is described. Generally, the way those inventions work is that when the electrical device the battery is powering is "turned on", the consequent closing of the operating circuit causes the valve system to open, admitting gas, normally air, to the battery or to a sealed area of the electrical appliance containing the battery. By using a microactuator to move a slide or flexing means, more fluid can be omitted. When the circuit is opened, meaning the electrical device the cell is powering is "turned off", the valve ultimately closes (there could be a time delay), precluding entry or exit of fluids or other impurities. The valve may not close as quickly as it opens, but this time is not significant compared to the many hours of time when exposure to the air would be typically closed off, and has the additional advantage of preventing "chatter", or unnecessary vibration, in certain applications.

There is sufficient residual oxygen or oxide compounds in the battery so that the battery will deliver sufficient power to start up and operate the valve on a chip. Such a battery has a higher starting power before oxygen fully penetrates the cathode pore structure. In any case a potential of generally over one volt exists between the cell electrodes.

These microactuator valve systems have the additional advantage that they are conducive to a pressure relief characteristic which continues to be usable as a vent closure after relief of the pressure, and to closing up when leakage occurs.

BRIEF DESCRIPTION OF THE DRAWINGS

The features referenced above and other features, objects and purposes of the present invention are discussed in greater detail in association with the accompanying drawings which aid in understanding the invention and its advantages and show a non-exhaustive group of embodiments.

BRIEF SUMMARY OF THE INVENTION

Figure 1A:
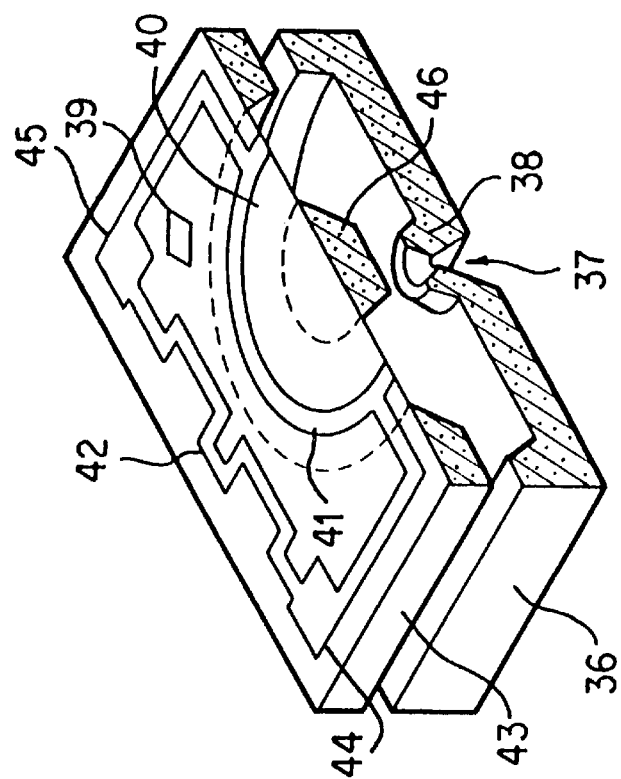
FIGS. 1(a) and (b) are schematic presentation of one type of microactuator, an automatic self-contained semiconductor actuator valve-on-a-chip 1(a); the valve-on-a-chip in FIG. 1(b) is particularly modified for this application with an adjusted or special resistor on the chip to carry the main current or a resistor in parallel with the chip circuit depending on the application, current requirements and the battery configuration.

The invention uses power only momentarily to power the valve system to open the valve, and then leaves it "latched" in place to allow air into the battery, and when the electrical appliance requiring the power is turned off, the valve system is closed to prevent air from degrading the battery. A delay feature can be included. The preferred embodiment uses a micromachined electrically activated thermally responsive semiconductor microactuator to cause two grids to slide by each other or bend and separate, and further, by a mechanical or electrical device, to only operate momentarily when the power of the appliance is turned on.

This valve system has the additional advantage that it is conducive to a pressure relief characteristic which continues to be usable as a vent closure after relief of the pressure.

The invention has another objective of rechargeability and claims are directed to use with a recharger.

Further, if the battery "leaks", the corrosive fluid will clog or to distort the valve system to cause the cell to cease to function generally by oxygen deprivation, although it may also occur by damaging the heating element which opens the semiconductor microactuator. This more reliably causes the battery to cease to operate when it is leaking than in prior art by other inventors.

In all, the difficulty has been to produce a combination that preserves the energy density of the cell, does not consume an undue amount of power and at the same time provides a cell that can be "dropped into" a device with the power system and/or electrical appliance functioning automatically to preclude fluid and impurity entry while the cell and device are not operating. By not needing to change the shape of the battery because of the small valve, the battery may be "dropped-in" to existing applications without need for modification of existing electrical devices which the invention will power.

There is sufficient residual oxygen or oxide compounds in the battery so that the battery will deliver sufficient power to start up and operate the valve on a chip. Such a battery has a higher starting power before oxygen fully penetrates the cathode pore structure. In any case a potential of generally over one volt exists between the battery electrodes.

Impurities and depolarizing gas are excluded from the battery while it is off, and when a circuit containing the battery is activated, the semiconductor microactuator opens and the battery operates. The primary characteristic the combination that achieves these objectives is the self-contained, normally closed aspect with the means of activation internal to the valve and adjacent to the valve opening.

The dual objectives of a valve cooperating with a battery or cell to relieve pressure, and also ceasing to function in the event of internal leakage from the interior of the battery or cell are achieved by this invention at the same time these power and size advantages are being realized.

By adding a resistance means in parallel with the valve to change the apparent resistance of the invention, and in particular the combined resistance of the shunt resistance means and the valve, the invention can be optimized to the operational voltage or amperage of the electrical load powered by the apparatus. In a typical flashlight cell, the desired voltage is less than the standard electric potential output of a zinc-air cell, and the internal resistance of the valve mechanism and a shunt resistance means can reduce the voltage to a desired level. In keeping with the miniature size, the resistance may be a thin film resistance means deposited on the semiconductor microactuator depending on the operational characteristics desired.

DESCRIPTION OF THE PREFERRED EMBODIMENTS

Figure 1B:
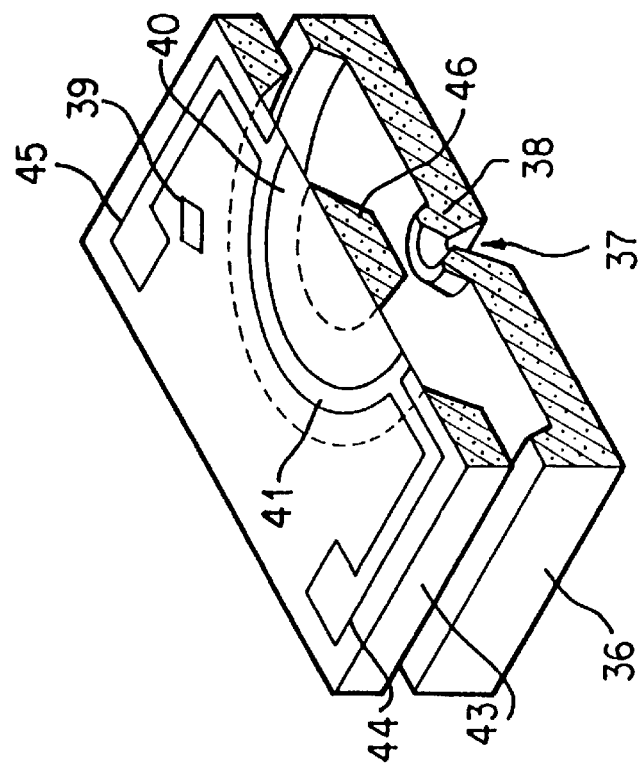
Figure 2:
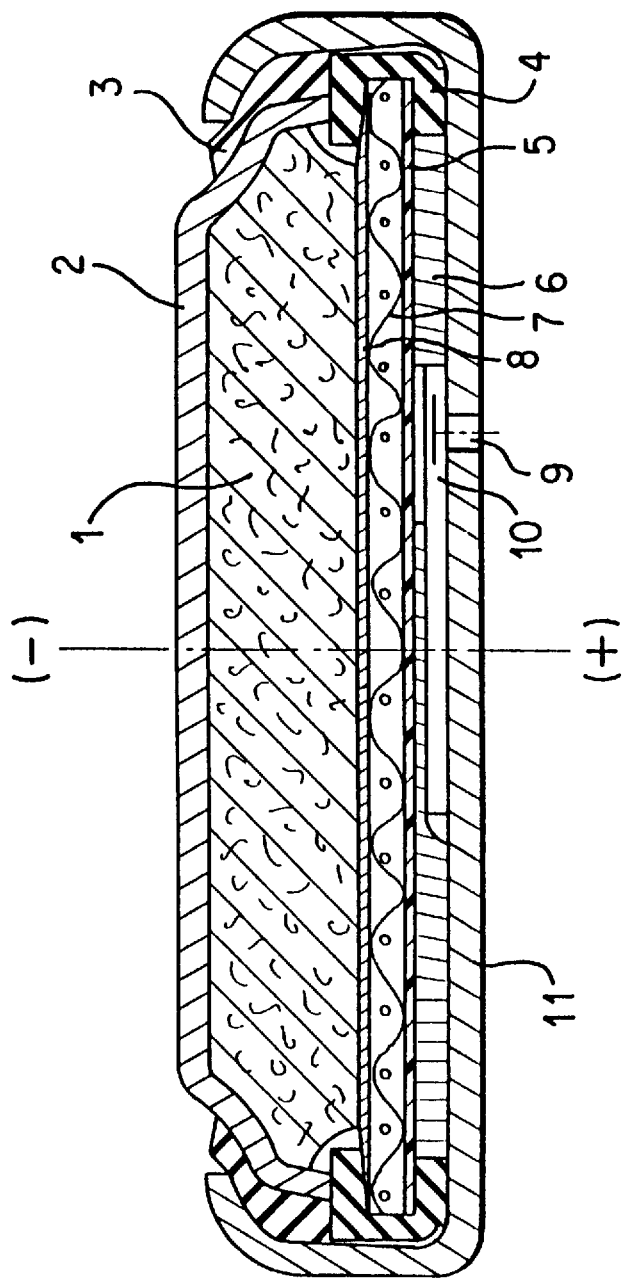
FIG. 2 diagrammatically illustrates a miniature metal-air cell with a valve-on-a-chip to control air entry.

FIGS. 1(a) and (b) and FIG. 2 most easily illustrate the microactuator portions of the invention. The microactuator preferred is best described as an electrically activated, thermally responsive semiconductor microactuator, and is preferably a small electronic semiconductor microactuator, a "valve-on-a-chip", after the art of J. H. Jerman, U.S. Pat. No. 5,069,419, Dec. 3, 1991, J. H. Jerman, U.S. Pat. No. 5,271,597, Dec. 21, 1993, or W. America, U.S. Pat. No. 4,969,938, Nov. 13, 1990, and a "Fluster: semiconductor microactuator described in Instruments and Apparatus News [IAN], October 1993, p. 47 and Electronic Design, Nov. 1, 1993 p. 34. The semiconductor microactuator pictured in FIG. 1 is approximately 4 millimeters square and 1 millimeter thick with the diaphragm 2.5 millimeters in diameter. The class of valves useful in this invention is broader than the Jerman, America or "Fluister" art because the self-contained, micromachined valve essential to this invention can include modifications of the Jerman, America or "Fluister" art. The expression "electrically activated, thermally responsive valve" therefore includes the Jerman art and like valves that include and importantly contain a cantilever deformable element, all of which deform on heating by electrical resistance. An alternative design in this class of electrically activated, thermally responsive valves is a valve that contains juxtaposed members secured at each of their correspondent ends which members are made of materials of different thermal expansion coefficients. When one of these elements is heated, preferably the member flexing more rapidly on application of heat, the member bends and opens a gap between the members to admit fluid. Such a design can be achieved by modern micromachining techniques. The term electrically activated, thermally responsive valve excludes any valve or actuator which does not contain, at least partially, the deformable element since the efficiencies of the invention cannot be obtained absent some containment for deformation. Containing the deformable element achieves comparable performance to the Jerman art which has solely translational displacement of its deformable member as the diaphragm heating varies, which means that the valve on a chip is substantially or completely irrotational and has little or no transverse movement in the direction of flow of the depolarizing fluid, which minimizes the space usage. There can be more than two layers and the layers may be of metal or semiconductor material.

An additional enhancement can be found in the America art which has greater pressure characteristics.

All of these variants of semiconductor microactuators are collectively referred to in this specification as a "microactuator."

The invention is readily adaptable to the family of gas depolarized electrochemical cells, most of which are described in McArthur et al., U.S. Pat. No. 4,547,438, Oct. 15, 1985, Zupancic, U.S. Pat. No. 4,529,673, Jul. 16, 1985, Mathews et al, U.S. Pat. No. 4,177,327, and in literature cited in those patents.

Figure 7A:
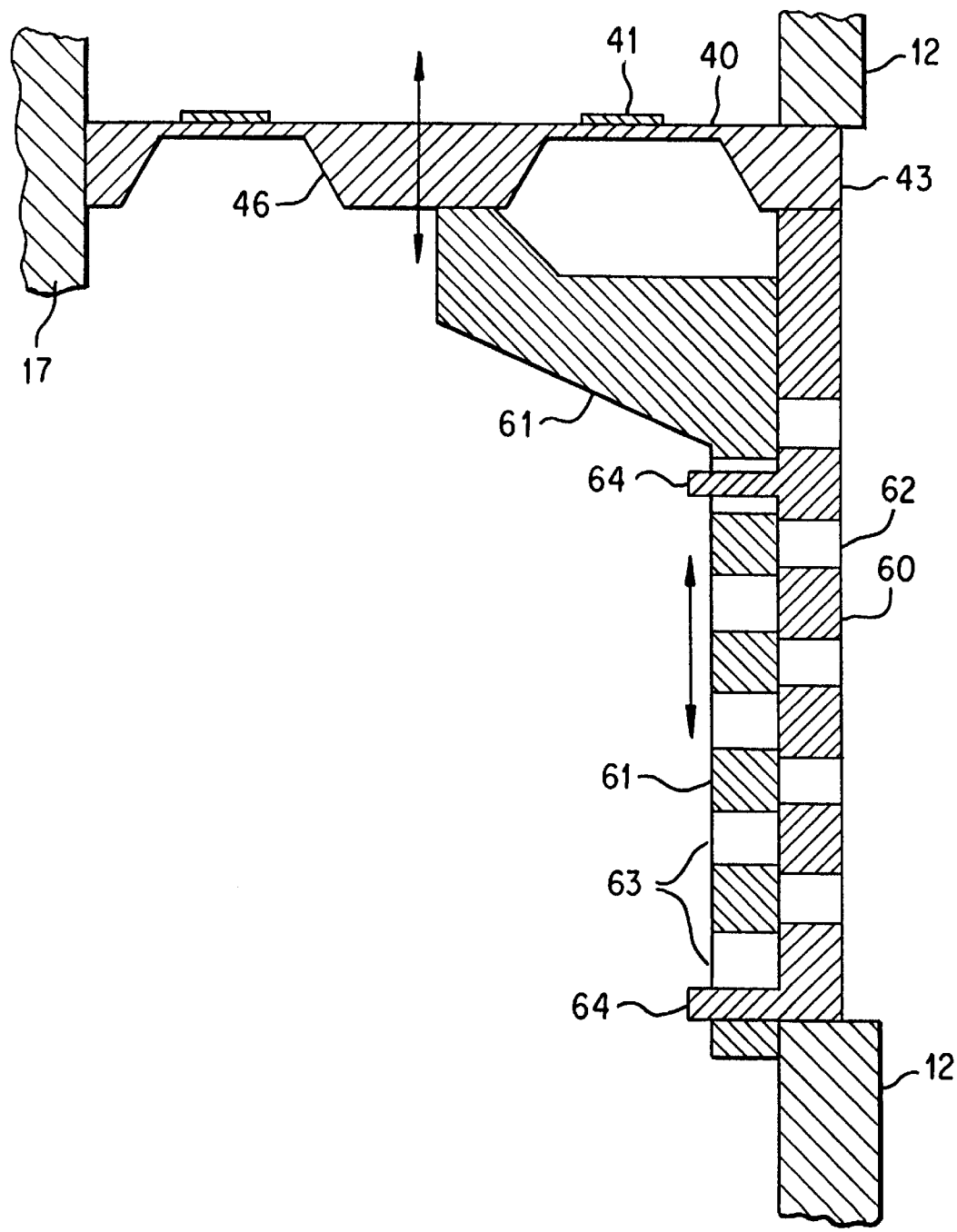
FIG. 7 (a) diagrammatically illustrates a sliding aperture mechanism linked to a deflecting diaphragm in the closed position and FIG. 7(b) illustrates the same sliding aperture mechanism linked to a deflected diaphragm in the open position.
Figure 7B:
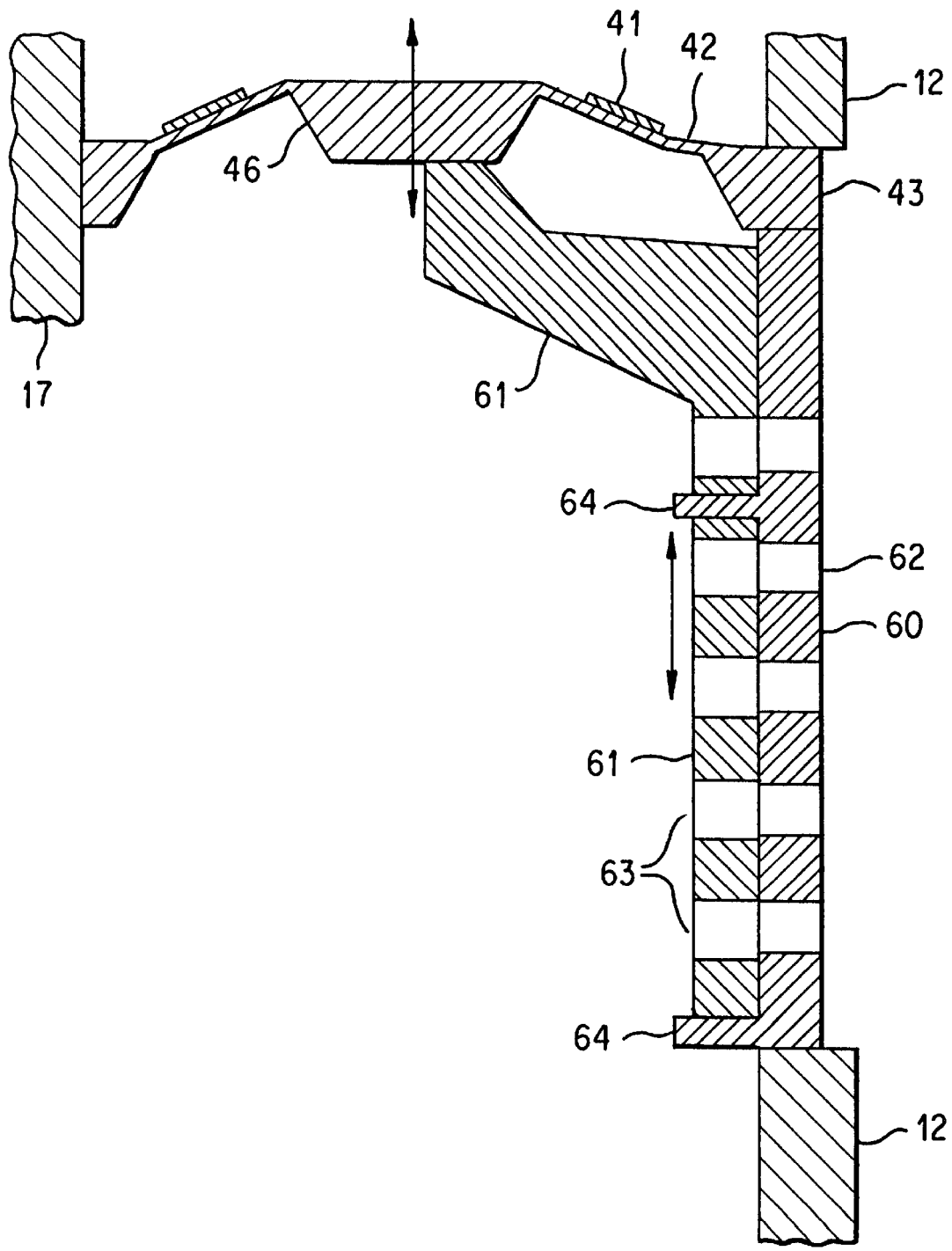

FIGS. 7(a) and 7(b) best illustrate the microactuator working in concert with a significant feature disclosed in the grid of apertures.

Figure 3:
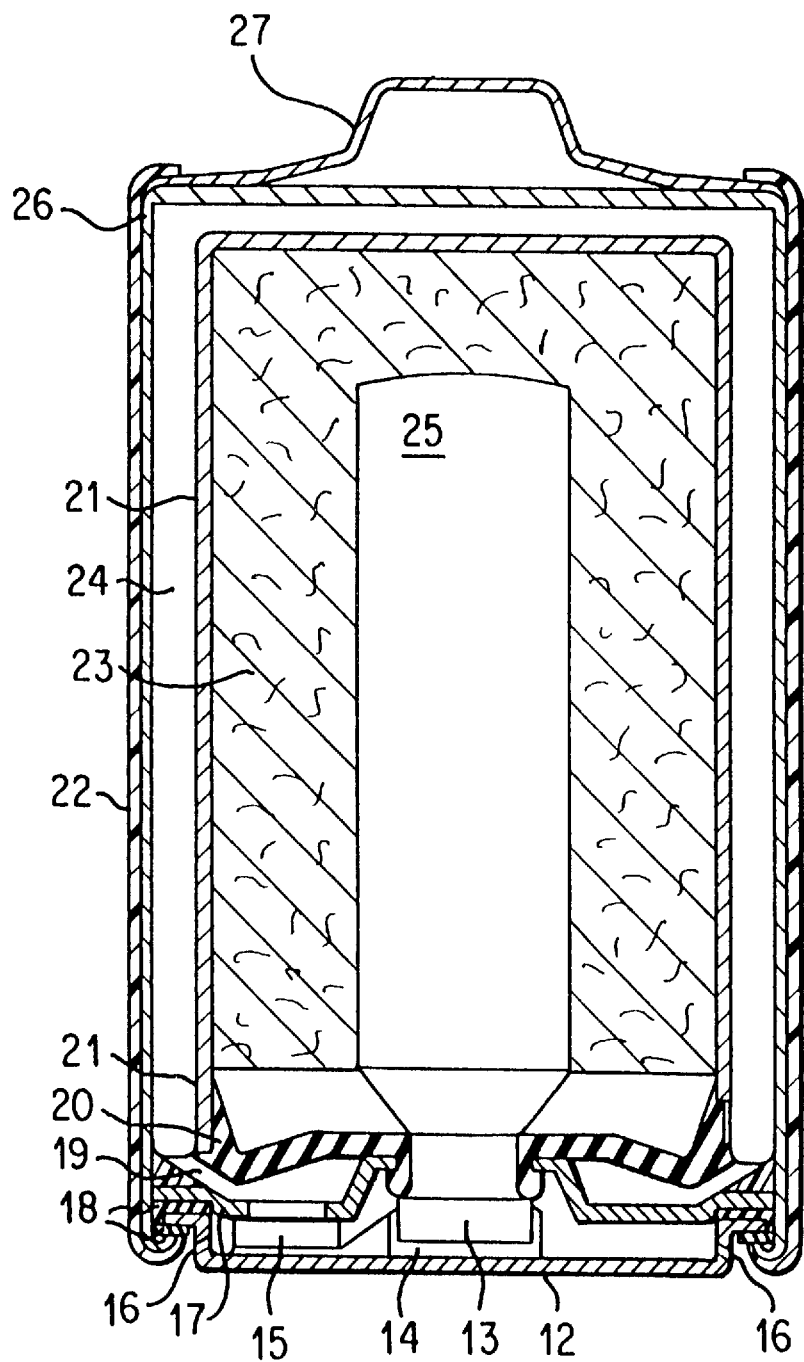
FIG. 3 diagrammatically illustrates a larger cylindrical metal-air cell with a valve-on-a-chip to control air entry.
Figure 4:
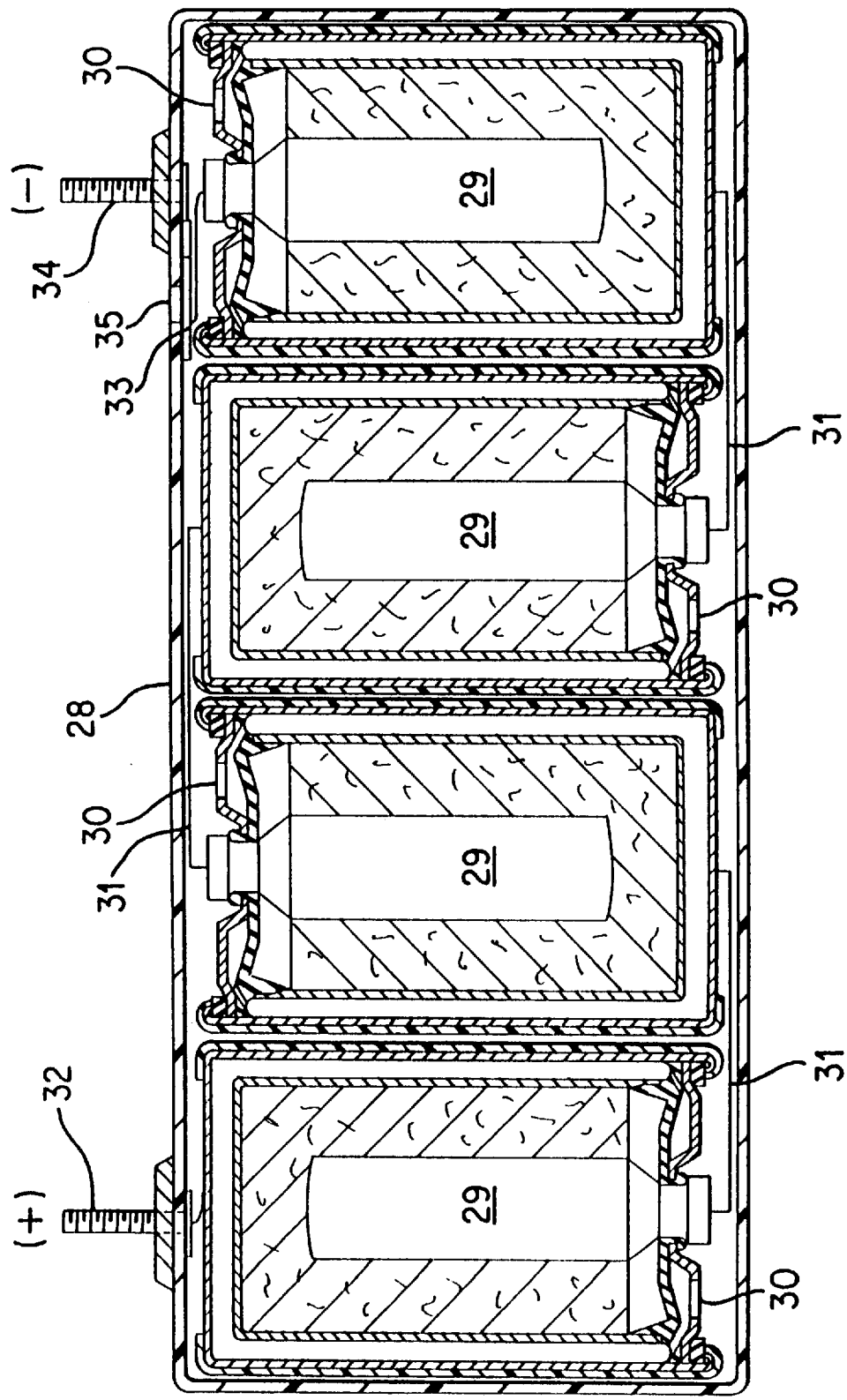
FIG. 4 diagrammatically illustrates the incorporation of a valve-on-a-chip in or on the battery case to control air access to a multiple cell battery contained in the case.
Figure 5A:
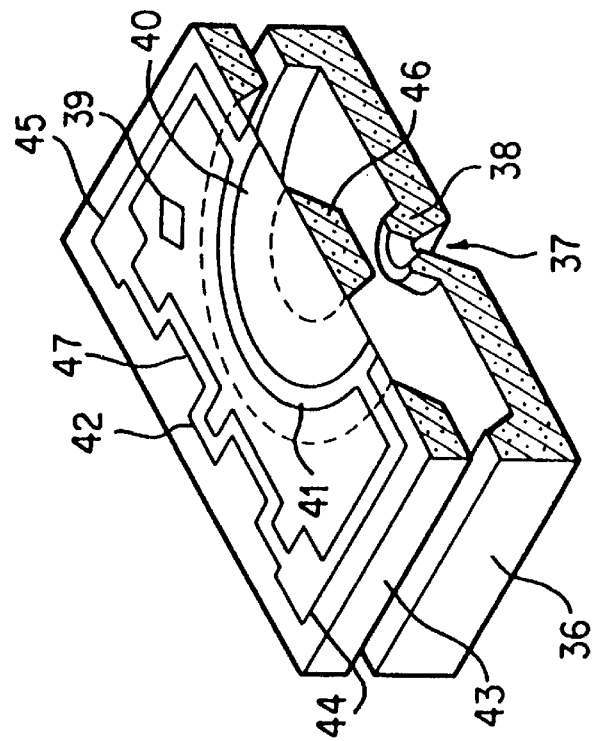
FIG. 5 diagrammatically illustrates the contrast between the cross section of the shunt resistance added to identical FIGS. 5(a) and 1(a) and seen in FIG. 1(b) and the reduced cross-section FIG. 5(b).
Figure 5B:
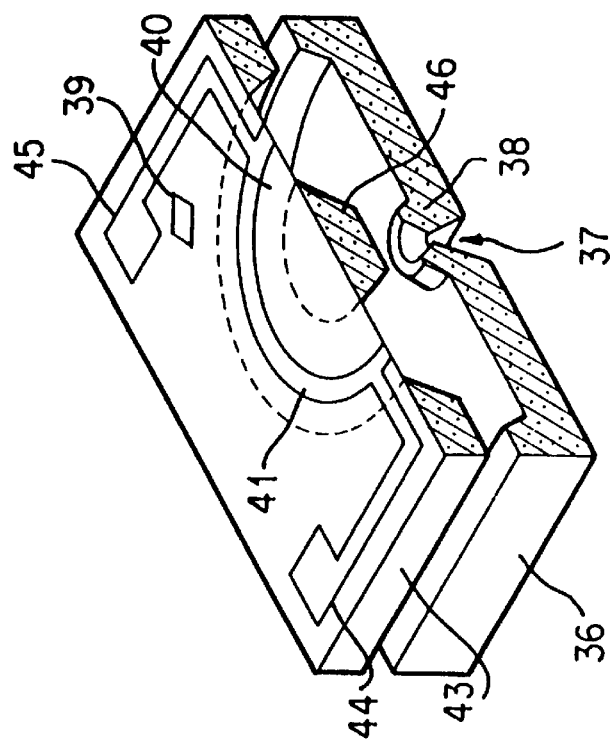
Figure 6:
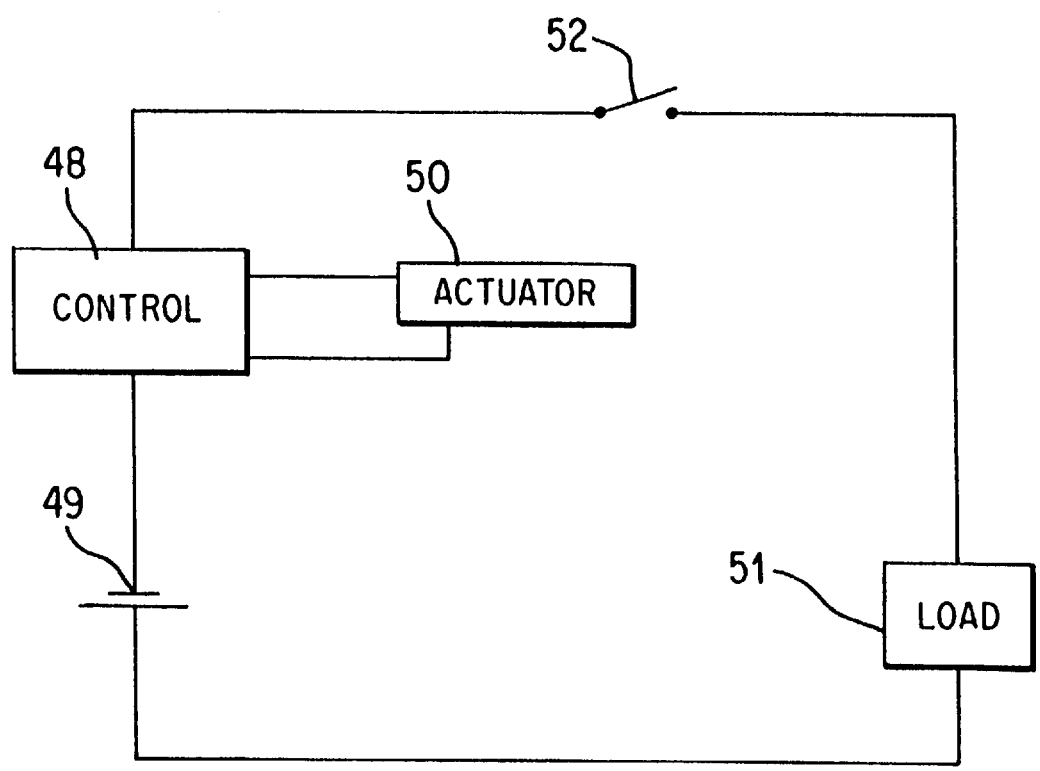
FIG. 6 schematically illustrates the addition of a microprocessor for control purposes in series with an electrical switch.

Various ways of disposing the microactuator on batteries of cells (usually referred to as a battery, though a battery can have just one cell) (collectively, a "battery"), are shown in FIGS. 2–4.

In FIG. 1(a), a micromachined silicon valve body (36) contains a port (37) (normally the outlet port to what will be the interior of the battery), a valve seat (38), and a port (39) (normally the inlet port from the ambient atmosphere outside the battery) with that valve body mated to another micromachined silicon body (43) with a resistance heated diaphragm (40), and a metallized area (41) which is the resistance area for heating the diaphragm. An additional resistance means, if one is added, is connected to two valve terminals (44) and (45).

More details of the embodiments of microactuators located on cells and batteries can be seen in U.S. Pat. No. 5,449,569 by the same inventor.

Additional sealants, cell parts and space refinements may be also employed in such a design without departing from the spirit of the invention.

The functionality of the displacement capability of the microactuators valves like those of Jerman (IC Sensors) or the "Fluster" type of (Redwood Systems) is improved in gas or liquid depolarized cells or batteries or other devices by constructing the fluid inlet portion of the valve perpendicular to the face of the microactuator part. FIGS. 7a and 7b illustrate the principle. One face part is displaced across the other to open a plurality of holes rather than only one hole. Thus if the sliding faces are mounted in the side of a battery, a battery case or a battery compartment, much more area for fluid flow and diffusion would be made available with the small movement of the valve face. Almost any material with adequate engineering properties such as strength and corrosion resistance could be used for the slide and hole portion of the valve assembly. Since the displacement force can be very high in these valves, especially the Fluster type, a rather large area slide assembly could be actuated.

In essence, this invention also proposes a significant augmentation of each of those valves. Plates of grids are used, preferably with diamond shaped apertures. The two plates of grids, when flat against each other, permit no fluid flow, but when one(or both) slides or is flexed, the apertures allow much more fluid flow than a plate or other occlusion device covering an inlet to a valve.

Referring to FIG. 7(a), the valve is observed in the closed position with diaphragm 40, metallic strip 41 and silicon valve body 43 attached between container part 12 and internal structural part 17. Valve fixed part 60 is placed and sealed in an opening in container 12 and has ports or ruled openings 62 in its face as well as guides 64 attached to hold the sliding portion 61 of the valve which sliding portion has ports or ruled openings 63 offset from those of fixed part 60 when the valve is closed as shown. In FIG. 7 (b) the valve is shown in the open position with diaphragm 42 bowed upward to accommodate the expansion caused by heating hence lifting the attachment part 46 pulling sliding portion (61) up and causing the ports or ruled openings 63 to coincide with the ports or ruled openings 62 in fixed part 60 thus allowing outside fluid to enter the battery or battery case or battery compartment depending on the nature of container 12.

These methodologies of augmenting the air flow of a valve system using a microactuator are disclosed in U.S. patents by Dr. Schumm bearing appl. Ser. No. 08/440,079 to be issued Jul. 30, 1996, and application Ser. No. 08/183,651 issued as U.S. Pat. No. 5,449,569, and are referred to as a "microactuator valve system."

Generally, the way those inventions work is that when the electrical device the battery is powering is "turned on", the consequent closing of the operating circuit causes the valve to open, admitting gas, normally air, to the battery or to a sealed area of the electrical appliance containing the battery. By using a slide means, more fluid can be admitted. When the circuit is opened, meaning the electrical device the cell is powering is "turned off", the valve ultimately closes (there could be a time delay), precluding entry or exit of fluids or other impurities. The valve may not close as quickly as it opens, but this time is not significant compared to the many hours of time when exposure to the air would be typically closed off, and has the additional advantage of preventing "chatter", or unnecessary vibration, in certain applications.

A similar assembly in FIG. 1(b) to that portrayed in FIG. 1(a) has a shunt resistance element (42) added to the chip as shown to make the device more functional for situations where the battery current needed for the apparatus to be powered is greater than could be delivered through the semiconductor microactuator absent a shunt resistor. Alternatively, a thin film resistance element between the terminals could be added to the chip as shown, physically or by depositing metallized material on the semiconductor microactuator, to make the device more functional in its valve-function-only configuration. A resistance element of optimized value and power capacity, normally between 0.05 and 1 ohms, which resistance is much less than the internal resistance of the semiconductor microactuator, could be wired in parallel with the semiconductor microactuator as an alternative design, especially for larger battery configurations.

Figure 8:
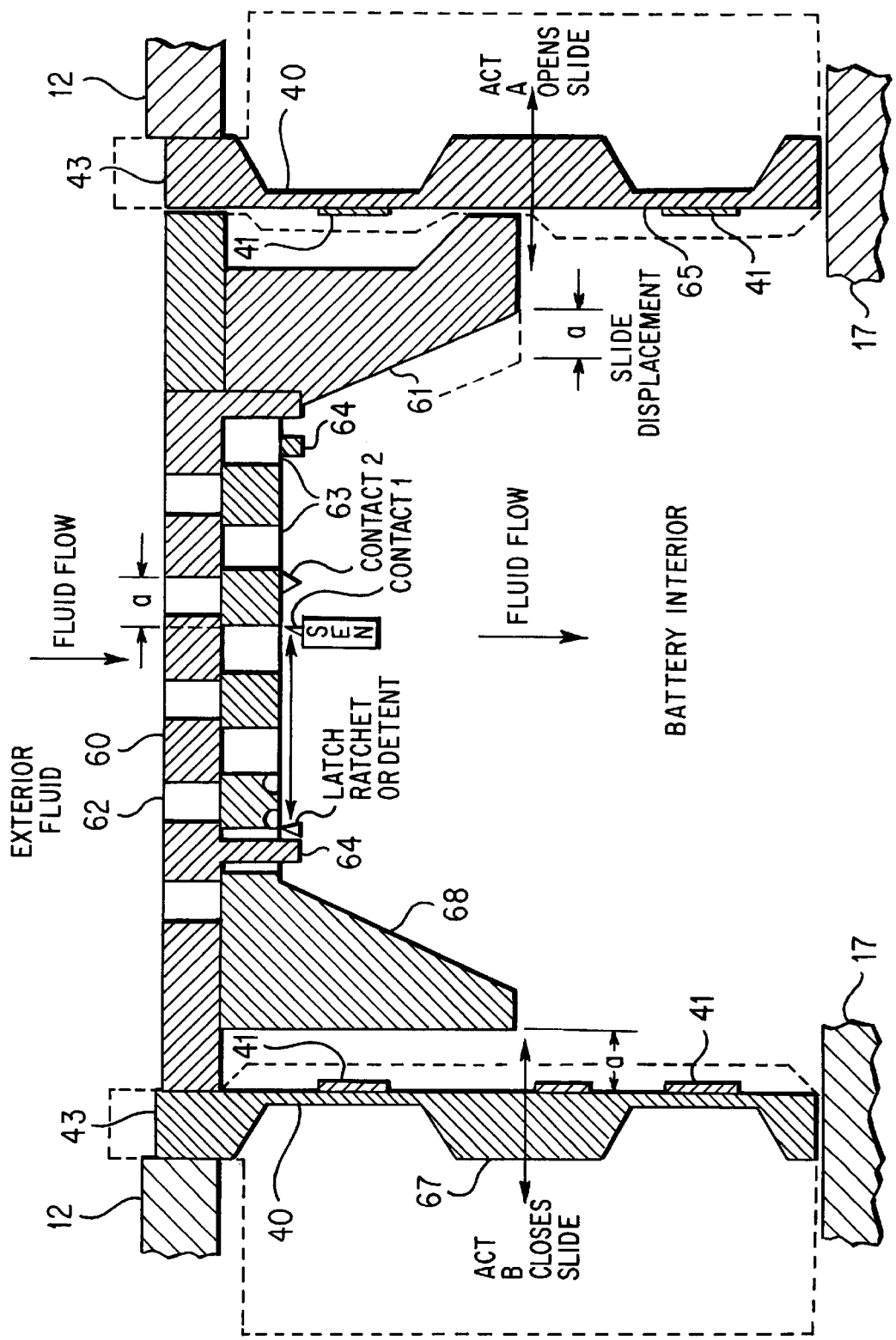
FIG. 8 shows a general sketch and arrangement of a two actuator system, ratchet or detente, and electrical parts.

An example of a two actuator system with latching means is represented in FIG. 8. ACT A and ACT B are each microactuators in a push-pull system operating a sliding portion (61) of the nature of that in FIGS. 7(a) and (b). In this system, the sliding portion (61) moves as a result of the action of Actuator A when the load is "turned on" and is captured or held by a ratchet or detente. To insure that a "latch" using a detent is effective, it is useful to design the system so that if the sliding portion(61) is jarred off position during use, ACT A pushes the sliding portion (61) back into position. When the system is powered down, i.e., the load is "turned off", there is a brief delay before actuator B cause the slide to move to the "off" position where it is captured or held by a ratchet or detente.

SEN is a sensor which has a CONTACT1 which, when the system is operated to the "open" position, meets CONTACT2 on the sliding portion (61). ACT A displaces the Slide by a distance "a", which lines up the ports (62) on the valve fixed part (60) with the ports (63) on the juxtaposed sliding portion (61) to admit fluid from the exterior atmosphere or fluid supply into the battery interior. If CONTACT1 is not in contact with CONTACT2, then the ports (62) on the valve fixed part (60) are not lined up with ports (63) on the sliding portion (61), potentially diminishing fluid flow into the battery. ACT B operates to return the sliding portion (61) to the closed position to preclude fluid flow. A second sensor and appropriate circuitry could be provided to detect when the slide has accidentally opened from a closed position, and to reclose the sliding portion (61) when it is intended to be closed. Or, a second set of contacts and appropriate circuitry could be used to stop closure of the sliding portion by causing deactivation of Actuator B. A means to hold or latch the sliding portion (61) in place such as a latch, detente or ratchet, including with electric circuitry to reset the sliding portion, referenced in FIG. 8, may be used to assist in holding the sliding portion (61) in the desired position, either open or closed. The numerical references correspond to elements referenced in FIGS. 7(a) and 7(b). However, the direction of the movement of the diaphragm (40) upon operation is toward the interior of the battery in this FIG. 8. Further, the part which was formerly the attachment part (46) in earlier figures is no longer attached to the sliding part (61). A center part (65) of Actuator A pushes the adjacent sliding part (66) and a center part of Actuator B (67) pushes the adjacent sliding part (68) at the opposite end of the sliding portion (61) of the valve.

Figure 9:
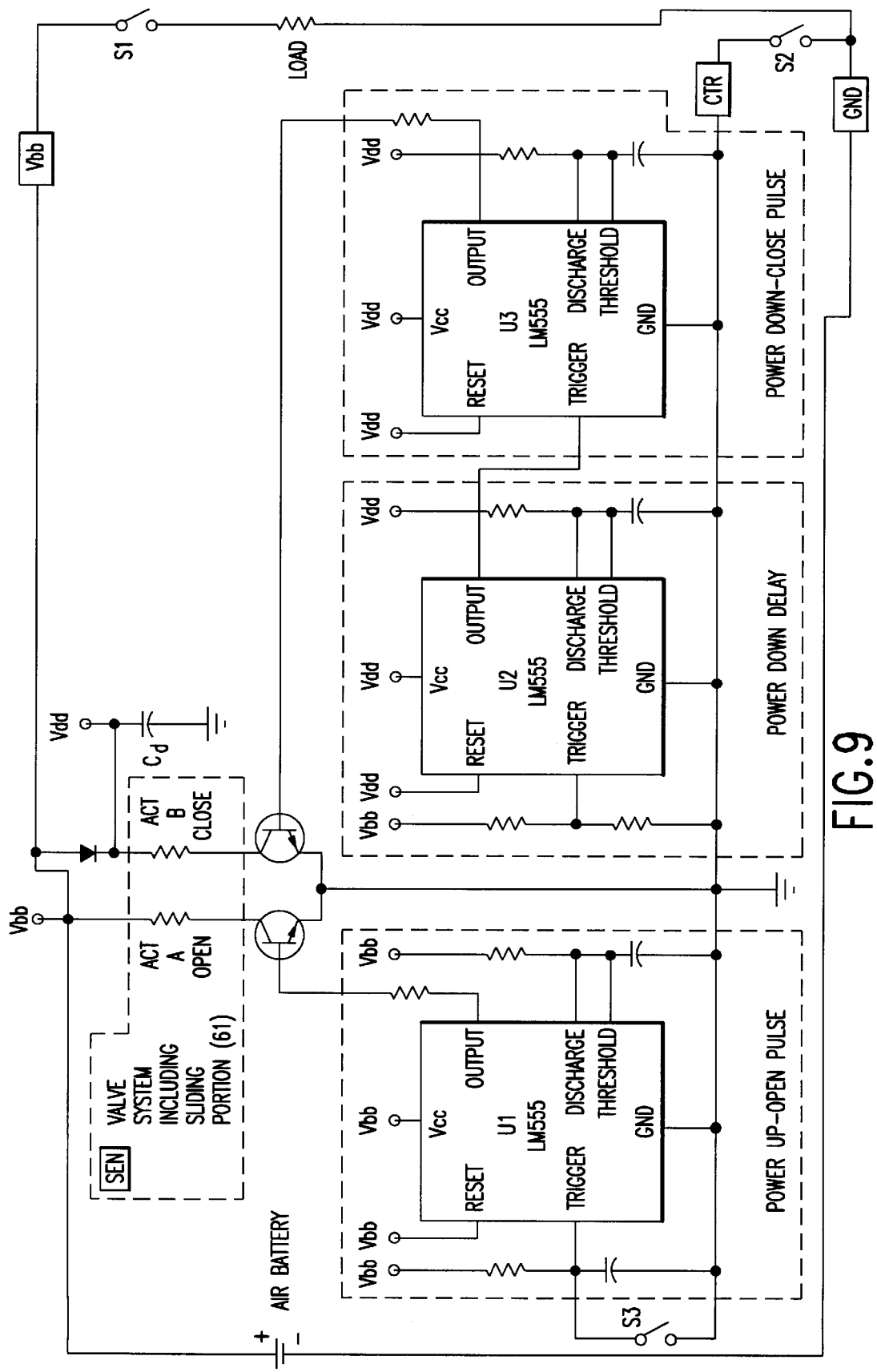
FIG. 9 shows a general sketch and arrangement of an electronic control circuit suitable for actuating the valve system.

FIG. 9 illustrates generally a circuit to implement the concepts disclosed in FIG. 8 and elsewhere in the patent. S1, S2, and S3 represent switches. U1, U2 and U3 represent timing and pulse delivery electronic devices. ACT A is the actuator A of FIG. 8 to open the valve system to admit air. ACT B is the actuator B of FIG. 8 to close the valve system. S2 is closed to power up U1 to deliver a short pulse to Actuator A opening the valve system and the sliding portion referenced in FIG. 8 to admit fluid, in this case air, to an air depolarized battery. $V_{bb}$ represents the ambient voltage across the battery terminals. Until $V_{bb}$ is at an acceptable level, this circuit preserves the option of waiting to manually or, by additional circuitry, automatically, close S1 which powers up the Load, and charges $C_d$. $C_d$ is a capacitor to store sufficient energy to provide power for U2, U3, and Actuator B when switches S1 and S2 are opened and the Load and battery are turned off. U2 is a timing delay circuit, and U3 provides a short pulse to operate Actuator B. $V_{dd}$ is the ambient voltage across $C_d$ after the capacitor is charged. The symbol GND with the box surrounding it represents the ground contact on the battery. The symbol $V_{bb}$ with the box surrounding it represents the positive terminal contact of the battery. The symbol CTR with the box surrounding it represents a second battery contact. S3 is controlled by sensor SEN which is an adjunct of the "Valve system including sliding portion (61)". In order to fully latch and implement the opening of the valve to admit fluid, Sensor SEN, as used in this FIG. 9 and in FIG. 8 detects if the slide mechanism of FIG. 8 (normally by the lack of adjacency of the contacts, and in particular the sliding portion (61), is not fully open or is ajar. If the sliding portion (61) is ajar, then SEN causes switch S3 to close momentarily to cause an additional pulse to Actuator A to open the valve system to admit fluid, in this case air, to the air battery.

In a different variation, a sensor can be used to deactivate Actuator A when the slide is in the open position. Timers may be included in the control of either opening or closing actions allowing the fuel or oxidizer fluids to enter on a delayed or continuing basis to optimize the battery functions or recharge the battery electrodes. When the sensor detects the valves are closed, the system returns to rest state until the next appliance use period.

Figure 11:
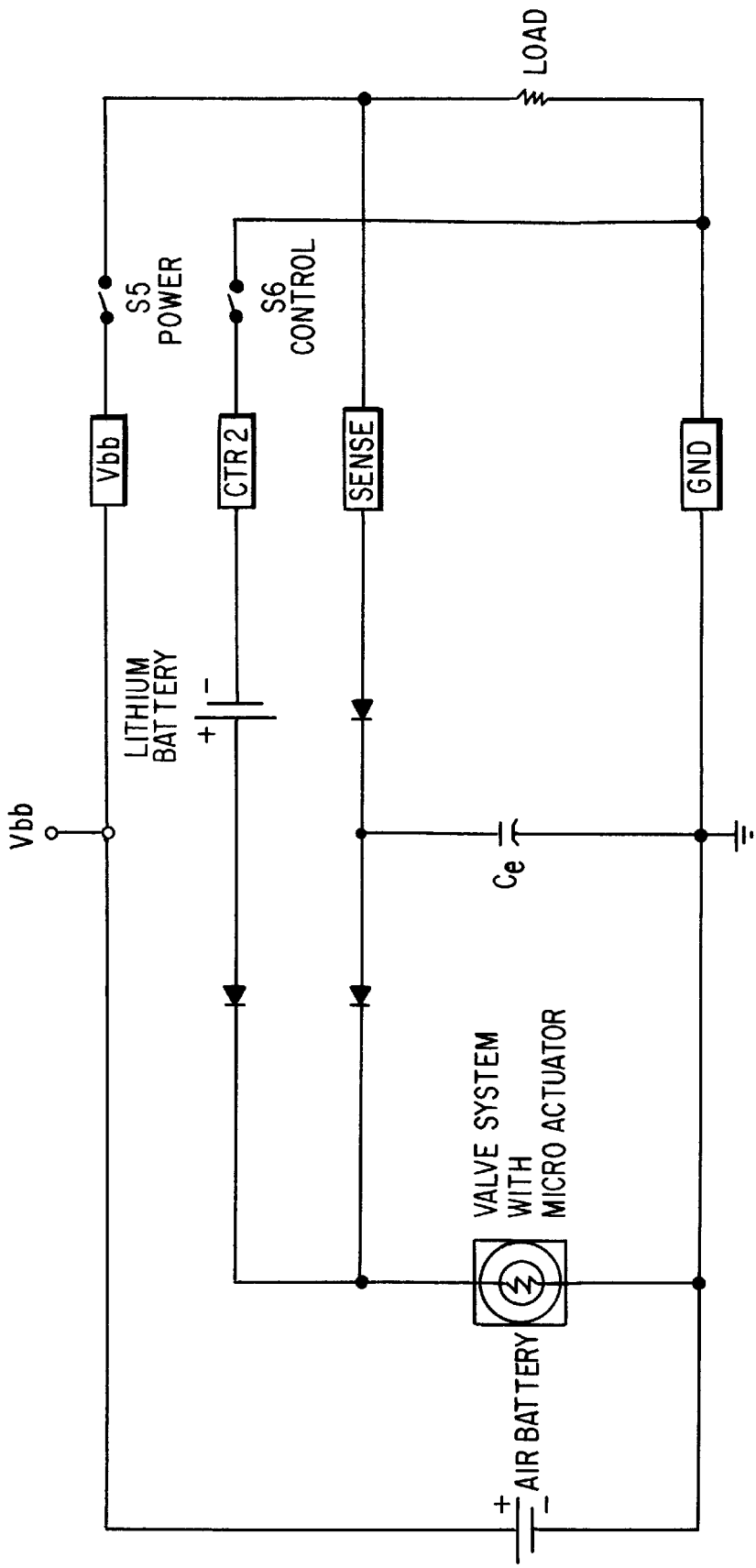
FIG. 11 shows an alternative more general sketch of possible circuitry with an auxiliary power source.

For a one actuator system, as can be inferred from FIG. 8 and FIG. 11, the microactuator could operate a ratchet system where each push of the microactuator opening the system or closing it pushes a rotating member or other mechanical system. Alternatively, each push of the microactuator opening the system or closing it could be coordinated with an electric or electronic system so that the system on the next activation or deactivation changes a mechanical gate from a position to initiate opening or closing of to the opposite desired position as appropriate.

Figure 10:
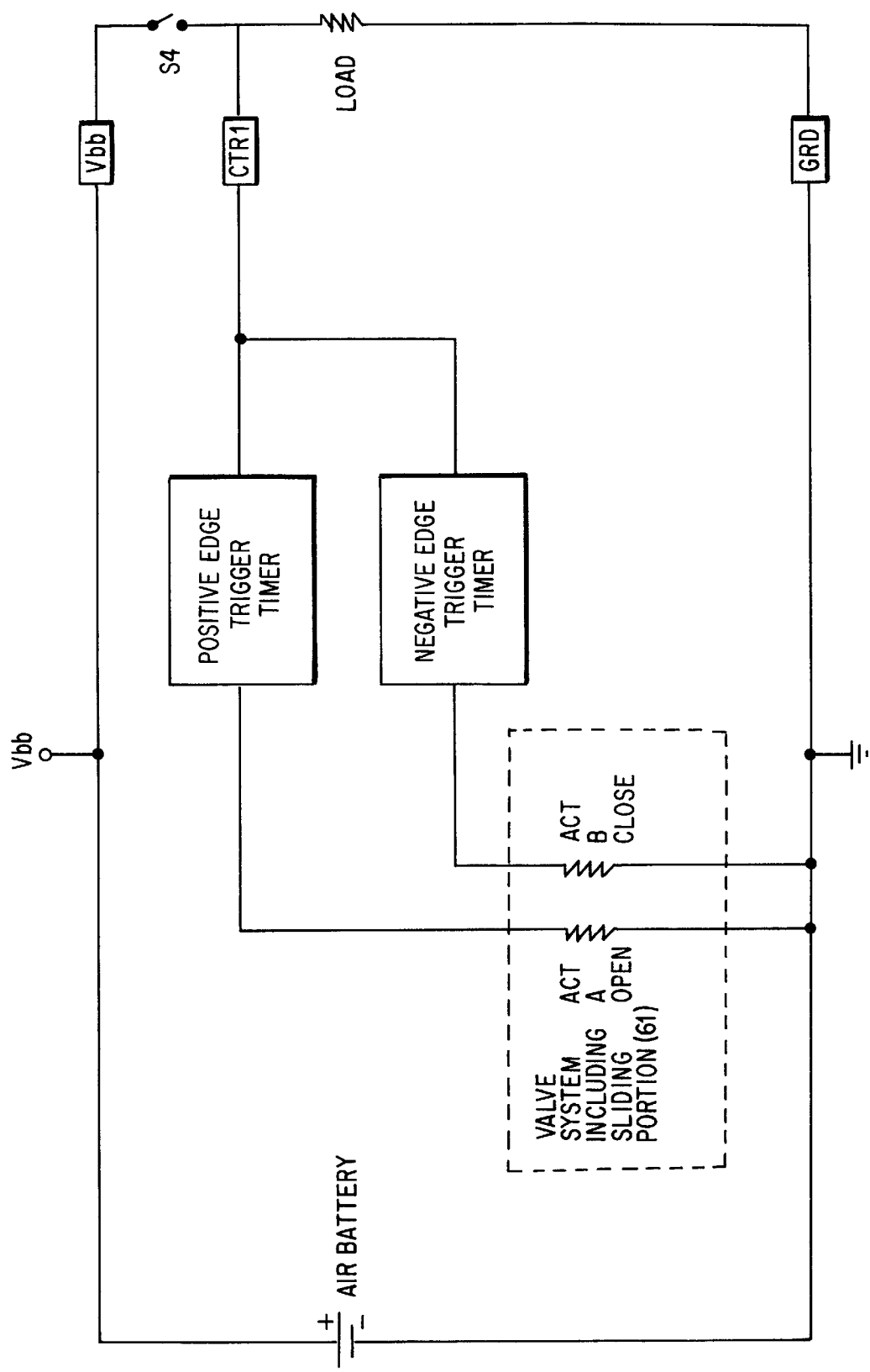
FIG. 10 shows a general insertion of a timer mechanism.

FIG. 10 illustrates generally a simpler concept of implementing the concepts disclosed in FIG. 8 and elsewhere in this patent. The terms used in FIG. 9 have the same meaning in FIG. 10, except as otherwise specified. However, there is only one switch: S4. When S4 is closed, turning on the Load and overall system, both the Load and Actuator A are operated, opening the valve system to admit air. When S4 is opened, the Load and valve system are turned off, and the valve system admits no fluid, in this case air, for an air battery. The Positive Edge Trigger Timer is an electronic device that produces a short pulse operating Actuator A opening the valve system. The Negative Edge Trigger Timer produces a short pulse operating Actuator B closing the valve system. The symbol GND with the box surrounding it represents the ground contact on the battery. The symbol $V_{bb}$ with the box surrounding it represents the positive terminal contact of the battery. The symbol CTR1 with the box surrounding it represents a second battery contact to operate the Positive Edge Trigger Timer and Negative Edge Trigger Timer which may operate at a different voltage than $V_{bb}$.

FIG. 11 illustrates an approach of using a second battery, in this case a Lithium battery, to power the microactuator until the voltage $V_{bb}$ from, in this example, an air battery is at an acceptable level. A switch S6, when closed powers the Valve system with Microactuator. The Valve System with Microactuator can utilize a single microactuator, one way slide system, or, with additional circuitry, a push-pull slide system. This circuit preserves the option of waiting to manually or, by additional circuitry, automatically, close S5 which powers up the Load, and charges $C_e$. $C_e$ is a capacitor to store sufficient energy to provide power for Actuator B when switches S5 and S6 are opened and the Load and batteries are turned off. The symbols $V_{bb}$, SENSE, and GND in boxes are contacts on the fluid depolarized cell, in this case an air battery. The symbol CTR2 in a box is a contact on the Lithium battery in this example.

The principal applications are expected to be for appliances such as computers using stored energy where portability is a premium feature. The invention can also be used for metal/metal. oxide-oxygen depolarized cells of a smaller size but other uses can be readily envisioned. For instance, the degree of opening of the semiconductor microactuator could be controlled by a small computer, microprocessor or other means and then the semiconductor microactuator used as a regulator of reactant air, cooling air, electrolyte circulation or other fluid flows.

The simplest way to integrate the microactuator or microactuators into the electric control system is to use them in series, if necessary with a shunt resistance (42) as shown in FIG. 1(b). In order to have the advantage of using them only momentarily, electric circuitry that sense when the operating circuit of the appliance has called for power is needed. This can occur by the circuit directly containing the battery being actuated, or by an electric circuit integrated with the terminals of the battery or the appliance switch sensing the call for power. If pressure relief is desired, the user would generally have the sliding portion (61) (which is a moving grid of apertures) located outside the fixed part (60) (which is a non-moving grid of apertures) and adjust the stiffness of the moving grid to the desired pressure relief level. The "leaking" closure can be implemented by directing leakage toward a microactuator so as to cause it to malfunction and starve the battery, or toward the apertures on the moving grid to clog them. A recharging mechanism is preferably designed to be connected to the electrical appliance to provide power to the battery to charge it.

The invention may have more than one open position and by so doing, integrated with control circuitry and a detector to spot the relative position, function as a fluid control device, with considerable precision if desired.

The embodiments represented herein are only a few of the many embodiments and modifications that a practitioner reasonably skilled in the art could make or use. The invention is not limited to these embodiments. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

I claim:

1. An improved electrical appliance powered by a fluid depolarized electrochemical battery having at least one cell, the improvement comprising:

said electrical appliance having a case;

said battery having an aperture;

said aperture being the sole means of admission of fluid to the interior of said battery;

said case being juxtaposed sealingly to said aperture;

said battery being insertable to said electrical appliance;

said electrical appliance further having a microactuator valve system disposed on said case to occlude admission of fluid to the interior of said battery when said appliance is not operating and to admit fluid to the interior of said battery when said appliance is operating.

2. The electrical appliance according to claim 1, further comprising:

said electrical appliance having a means of connecting a recharging system to said battery.

3. An improved electrical appliance powered by a fluid depolarized electrochemical battery having at least one cell, the improvement comprising:

said electrical appliance having a sealable battery compartment;

said battery being insertable into said sealable battery compartment;

said sealable battery compartment having a microactuator valve system to occlude admission of fluid to the interior of said sealable battery compartment and said battery when said appliance is not operating and to admit fluid to the interior of said sealable battery compartment and said battery when such appliance is operating.

4. The electrical appliance according to claim 3, further comprising:

said electrical appliance having a means of connecting a recharging system to said battery.

5. An improved means for admitting fluid to a fluid depolarized electrochemical battery having at least one cell disposed in an electrical appliance having an on/off switch and having a sealable battery compartment, the improvement comprising:

at least two microactuators delivering a transverse motion upon application of power;

said battery being removable from and insertable to said electrical appliance and sealable battery compartment;

a slide means having slide means apertures and having at least one open position and a closed position;

an occlusion means adjacent to said slide means, said occlusion means having occlusion means apertures disposed to be juxtaposed to said slide means apertures to admit fluid through said slide means and said occlusion means when said slide means is moved to said at least one open position, and disposed to occlude fluid flow when said slide means is moved to said closed position;

said slide means and occlusion means being disposed to cooperate with said sealable battery compartment to be the sole means of admission of fluid to said battery;

a means for transferring said transverse motion of said at least two microactuators to said slide means;

at least one detection means for detecting the position of said slide means and for signalling that said slide means has reached said at least one open or said closed position;

a control means interconnected with said on/off switch, with said at least two microactuators, and with said at least one detection means so that when said on/off switch is actuated to an "on" position, said control means allows power to be applied to one of said at least two microactuators to cause said microactuator to move said slide means to said at least one open position, and upon said slide means being in said at least one open position, said control means responds to said signalling of at least one detection means and terminates application of power to said at least one of said at least two microactuators, and so that when said on/off switch is actuated to an "off" position, said control means allows power to be applied to at least one other of said at least two microactuators to cause said microactuator to move said slide means to said closed position, and upon said slide means being in said closed position, said control means responds to said signalling of said at least one detection means and terminates application of power to said at least one other of said at least two microactuators.

6. The fluid admitting means according to claim 5, further comprising:

at least one latching means for holding said slide means in at least said at least one open position.

7. The fluid admitting means according to claim 6, further comprising:

at least two latching means for holding said slide means in said at least one open position and said closed position.

8. The fluid admitting means according to claim 7, further comprising:

said control means having a means for delaying actuation of at least one of said at least two microactuators.

9. The fluid admitting means according to claim 8, further comprising:

said electrical appliance having a means of connecting a recharging system to said battery.

10. The fluid admitting means according to claim 9, further comprising:

said control means having interconnections and terminals for recharging said battery.

11. The fluid admitting means according to claim 10, further comprising:

said one of said at least one microactuators that causes said slide means to move to said at least one open position being disposed to malfunction upon application of excess pressure inside said electrical appliance and to deform to relieve said excess pressure.

12. The fluid admitting means according to claim 11, further comprising:

said one of said at least one microactuators that causes said slide means to move to said at least one open position being disposed to malfunction upon leakage from said battery and malfunction to prevent said battery from delivering power.

13. The fluid admitting means according to claim 12, further comprising:

said control system having a power source independent of said battery.

14. An improved means for admitting fluid to a fluid depolarized electrochemical battery having at least two terminals, said battery powering an electrical appliance, the improvement comprising:

at least two microactuators delivering a transverse motion upon application of power;

a slide means having slide means apertures and having at least one open position and a closed position;

an occlusion means adjacent to said slide means, said occlusion means having occlusion means apertures disposed to be juxtaposed to said slide means apertures to admit fluid through said slide means and said occlusion means into said battery when said slide means is moved to said at least one open position, and disposed to occlude fluid flow into said battery when said slide means is moved to said closed position;

a means for transferring said transverse motion of said at least two microactuators to said slide means;

at least one detection means for detecting the position of said slide means and for signalling that said slide means has reached said open or said closed position;

a control means interconnected with said at least two terminals to detect whether said electrical appliance is "on" or "off", and cooperating with said at least two microactuators and with said at least one detection means so that when said electrical appliance is "on", said control means allows power to be applied to one of said at least two microactuators to cause said microactuator to move said slide means to said at least one open position, and upon said slide means being in said at least one open position, said control means responds to said signalling of said at least one detection means and terminates application of power to said one of at least two microactuators, and so that when said electrical appliance is "off", said control means allows power to be applied to at least one other of said at least two microactuators to cause said microactuator to move said slide means to said closed position, and upon said slide means being in said closed position, said control means responds to said signalling of said at least one detection means and terminates application of power to said at least one other of said at least two microactuators.

15. The fluid admitting means according to claim 14, further comprising:
said slide means, said occlusion means and said at least two microactuators being disposed on said electrical appliance, said battery having an aperture, said aperture of said battery being disposed to cooperate sealingly with said slide means and said occlusion means.

16. The fluid admitting means according to claim 15, further comprising:
at least one latching means for holding said slide means in at least said at least one open position.

17. The fluid admitting means according to claim 16, further comprising:
at least two latching means for holding said slide means in said at least one open position and said closed position.

18. The fluid admitting means according to claim 17, further comprising:
said control means having a means for delaying actuation of at least one of said at least two microactuators.

19. The fluid admitting means according to claim 18, further comprising:
said electrical appliance having a means of connecting a recharging system to said battery.

20. The fluid admitting means according to claim 19, further comprising:
said control means having interconnections and terminals for recharging said battery.

21. The fluid admitting means according to claim 20, further comprising:
said one of said at least one microactuators that causes said slide means to move to said at least one open position being disposed to malfunction upon application of excess pressure inside said battery and to deform to relieve said excess pressure.

22. The fluid admitting means according to claim 21, further comprising:
said one of said at least one microactuators that causes said slide means to move to said at least one open position being disposed to malfunction upon leakage from said battery and malfunction to prevent said battery from delivering power.

23. The fluid admitting means according to claim 22, further comprising:
said control system having a power source independent of said battery.

24. The fluid admitting means according to claim 14, further comprising:
said slide means, said occlusion means and said at least two microactuators being disposed on said battery, said battery having an aperture, said aperture of said battery being disposed to cooperate sealingly with said slide means and said occlusion means.

25. The fluid admitting means according to claim 24, further comprising:
at least one latching means for holding said slide means in at least said at least one open position.

26. The fluid admitting means according to claim 25, further comprising:
at least two latching means for holding said slide means in said at least one open position and said closed position.

27. The fluid admitting means according to claim 26, further comprising:
said control means having a means for delaying actuation of at least one of said at least two microactuators.

28. The fluid admitting means according to claim 27, further comprising:
said electrical appliance having a means of connecting a recharging system to said battery.

29. The fluid admitting means according to claim 28, further comprising:
said control means having interconnections and terminals for recharging said battery.

30. The fluid admitting means according to claim 29, further comprising:
said one of said at least one microactuators that causes said slide means to move to said at least one open position being disposed to malfunction upon application of excess pressure inside said battery and to deform to relieve said excess pressure.

31. The fluid admitting means according to claim 30, further comprising:
said one of said at least one microactuators that causes said slide means to move to said at least one open position being disposed to malfunction upon leakage from said battery and malfunction to prevent said battery from delivering power.

32. The fluid admitting means according to claim 31, further comprising:
said control system having a power source independent of said battery.

33. An improved means for admitting fluid to a fluid depolarized electrochemical battery having at least one cell disposed in an electrical appliance having an on/off switch and having a sealable battery compartment, the improvement comprising:
at least one microactuator delivering a transverse motion upon application of power;
said battery being removable from and insertable to said electrical appliance and sealable battery compartment and having said aperture disposed to cooperate sealingly to said sealable battery compartment;
a slide means having slide means apertures and having at least one open position and a closed position;
an occlusion means adjacent to said slide means, said occlusion means having occlusion means apertures disposed to be juxtaposed to said slide means apertures to admit fluid through said slide means and said occlusion means when said slide means is moved to said at least one open position, and disposed to occlude fluid flow when said slide means is moved to said closed position;
said slide means and occlusion means being disposed to cooperate with said sealable battery compartment to be the sole means of admission of fluid to said battery;

a ratcheting means and a means for transferring said transverse motion of said at least one microactuator to said ratcheting means in order to move said slide means alternately from said closed position to said at least one open position, and from said at least one open position to said closed position;

at least one detection means for detecting the position of said slide means and for signalling that said slide means has reached said open or said closed position;

a control means interconnected with said on/off switch, with said at least one microactuator, and with said at least one detection means so that when said on/off switch is actuated to an "on" position, said control means allows power to be applied to said at least one microactuator to cause said microactuator to move said ratcheting means to move said slide means to said at least one open position, and upon said slide means being in said at least one open position, said control means responds to said signalling from said at least one detection means and terminates application of power to said at least one microactuator, and so that when said on/off switch is actuated to an "off" position, said control means allows power to be applied to said at least one microactuator to cause said microactuator to move said slide means to said closed position, and upon said slide means being in said closed position, said at least one control means responds to said signalling from said at least one detection means and signals said control means to cease application of power to said at least: one microactuator.

34. The fluid admitting means according to claim 33, further comprising:

at least one latching means for holding said slide means in at least said at least one open position.

35. The fluid admitting means according to claim 34, further comprising:

at least two latching means for holding said slide means in said at least one open position and said closed position.

36. The fluid admitting means according to claim 35, further comprising:

said control means having a means for delaying actuation of at least one of said at least two microactuators.

37. The fluid admitting means according to claim 36, further comprising:

said electrical appliance having a means of connecting a recharging system to said battery.

38. The fluid admitting means according to claim 37, further comprising:

said control means having interconnections and terminals for recharging said battery.

39. The fluid admitting means according to claim 38, further comprising:

said one of said at least one microactuators that causes said slide means to move to said at least one open position being disposed to malfunction upon application of excess pressure inside said electrical appliance and to deform to relieve said excess pressure.

40. The fluid admitting means according to claim 39, further comprising:

said one of said at least one microactuators that causes said slide means to move to said at least one open position being disposed to malfunction upon leakage from said battery and malfunction to prevent said battery from delivering power.

41. The fluid admitting means according to claim 40, further comprising:

said control system having a power source independent of said battery.

42. An improved means for admitting fluid to a fluid depolarized electrochemical battery having at least two terminals powering an electrical appliance, the improvement comprising:

at least one microactuator delivering a transverse motion upon application of power;

a slide means having slide means apertures and having at least one open position and a closed position;

an occlusion means adjacent to said slide means, said occlusion means having occlusion means apertures disposed to be juxtaposed to said slide means apertures to admit fluid through said slide means and said occlusion means into said battery when said slide means is moved to said at least one open position, and disposed to occlude fluid flow into said battery when said slide means is moved to said closed position;

a ratcheting means and a means for transferring said transverse motion of said at least one microactuator to said ratcheting means in order to move said slide means alternately from said closed position to said at least one open position, and from said at least one open position to said closed position;

at least one detection means for detecting the position of said slide means and for signalling said control means that said slide means has reached said open or said closed position;

a control means interconnected with said at least two terminals to detect whether said electrical appliance is "on" or "off", and cooperating with said at least one microactuator and with said at least one detection means so that when said electrical appliance is "on", said control means allows power to be applied to said at least one microactuator to cause said microactuator to move said slide means to said at least one open position, and upon said slide means being in said at least one open position, said control means responds to said signalling from said at least one detection means and terminates application of power to said at least one microactuator, and so that when said electrical appliance is "off", said control means allows power to be applied to said at least one microactuator to cause said microactuator to move said slide means to said closed position, and upon said slide means being in said closed position, said control means responds to said signalling from said at least one detection means and terminates application of power to said at least one microactuator.

43. The fluid admitting means according to claim 42, further comprising:

said slide means, said occlusion means and said at least twain microactuators being disposed on said electrical appliance, said battery having an aperture, said aperture of said battery being disposed to cooperate sealingly with said slide means and said occlusion means.

44. The fluid admitting means according to claim 43, further comprising:

at least one latching means for holding said slide means in at least said at least one open position.

45. The fluid admitting means according to claim 44, further comprising:

at least two latching means for holding said slide means in said at least one open position and said closed position.

46. The fluid admitting means according to claim 45, further comprising:

said control means having a means for delaying actuation of at least one of said at least two microactuators.

47. The fluid admitting means according to claim 46, further comprising:

said electrical appliance having a means of connecting a recharging system to said battery.

48. The fluid admitting means according to claim 47, further comprising:

said control means having interconnections and terminals for recharging said battery.

49. The fluid admitting means according to claim 48, further comprising:

said one of said at least one microactuators that causes said slide means to move to said at least one open position being disposed to malfunction upon application of excess pressure inside said battery and to deform to relieve said excess pressure.

50. The fluid admitting means according to claim 49, further comprising:

said one of said at least one microactuators that causes said slide means to move to said at least one open position being disposed to malfunction upon leakage from said battery and malfunction to prevent said battery from delivering power.

51. The fluid admitting means according claim 50, further comprising:

said control system having a power source independent of said battery.

52. The fluid admitting means according to claim 42, further comprising:

said slide means, said occlusion means and said at least two microactuators being disposed on said battery, said battery having an aperture, said aperture of said battery being disposed to cooperate sealingly with said slide means and said occlusion means.

53. The fluid admitting means according to claim 52, further comprising:

at least one latching means for holding said slide means in at least said at least one open position.

54. The fluid admitting means according to claim 53, further comprising:

at least two latching means for holding said slide means in said at least one open position and said closed position.

55. The fluid admitting means according to claim 54, further comprising:

said control means having a means for delaying actuation of at least one of said at least two microactuators.

56. The fluid admitting means according to claim 55, further comprising:

said electrical appliance having a means of connecting a recharging system to said battery.

57. The fluid admitting means according to claim 56, further comprising:

said control means having interconnections and terminals for recharging said battery.

58. The fluid admitting means according to claim 57, further comprising:

said one of said at least one microactuators that causes said slide means to move to said at least one open position being disposed to malfunction upon application of excess pressure inside said battery and to deform to relieve said excess pressure.

59. The fluid admitting means according to claim 58, further comprising:

said one of said at least one microactuators that causes said slide means to move to said at least one open position being disposed to malfunction upon leakage from said battery and malfunction to prevent said battery from delivering power.

60. The fluid admitting means according to claim 59, further comprising:

said control system having a power source independent of said battery.

\* \* \* \* \*